United States Patent Office 3,415,932
Patented Dec. 10, 1968

3,415,932

7 - CHLORO - 4 - [4-(2-HYDROXYETHYLAMINO)-1-METHYLBUTYLAMINO]QUINOLINE; ANTI-INFLAMMATORY COMPOSITIONS AND METHOD USING SAME

Emery W. Dennis, Albany, Evan W. McChesney, Bethlehem, and Alexander R. Surrey, Albany, N.Y., assignors to Sterling Drug Inc., New York, N.Y., a corporation of Delaware No Drawing. Filed May 18, 1965, Ser. No. 456,810
4 Claims. (Cl. 424—258)

This invention relates to compositions of matter of the class of 4-aminoalkylaminoquinolines, to anti-inflammatory compositions containing same, and to a method for suppressing inflammation in an animal host.

The invention sought to be patented, in one composition aspect, resides in the compound which we designate 7-chloro - 4-[4 - (2-hydroxyethylamino) - 1 - methylbutylamino]quinoline. Accordingly, we depict this compound as having chloro attached to the 7-position and 4-(2-hydroxyethylamino)-1-methybutylamino attached to the 4-position of the quinoline nucleus and as having the Formula I

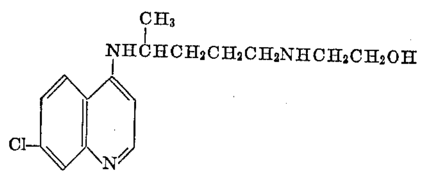

II

The tangible embodiments of this composition aspect of the invention possess the inherent applied use characteristics of having anti-inflammatory properties, as demonstrated by known pharmacological test procedures, e.g., inhibition of endotoxin-induced lung inflammation in mice. These embodiments of our invention thus are indicated to be useful in the treatment of inflammatory syndromes.

The compound of Formula I is prepared by reacting a 7-chloro-4-(4-halo-1-methylbutylamino) quinoline where halo is preferably bromo or chloro with 2-hydroxyethylamine. This preparation is illustrated further hereinbelow in the specific exemplary disclosure. Said intermediate quinolines, which are known compounds, are obtained by reacting 7-chloro-4-(4-hydroxyl-1-methylbutylamino)quinoline with a halogenating agent, e.g., hydrogen bromide to form the bromo compound or thionyl chloride to form the chloro compound. The intermediate hydroxy compound, also known, is prepared by reacting 4,7-dichloroquinoline with 4-hydroxy-1-methylbutylamine.

The compound of Formula I is useful both in free base form and in acid addition salt form and both forms are within the purview of the invention, and are considered to be one and the same invention. The acid addition salts are simply a usually more convenient form for use; and, in practice, use of the salt form inherently amounts to use of the base form. The acids which can be used to prepare the acid addition salts are preferably those which produce, when combined with the free base, pharmaceutically-acceptable salts, that is, salts whose anions are relatively innocuous to the animal organism in therapeutic doses of the salts, so that the beneficial properties inherent in the free base are not vitiated by side effects ascribable to the anions; in other words, the latter do not substantially affect the therapeutic properties inherent in the cations. Appropriate pharmaceutically-acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, ascorbic acid, methanesulfonic acid, ethanesulfonic acid, quinic acid, 3-hydroxy-2-naphthoic acid, naponic acid (1,5-naphthalenedisulfonic acid), acetylsalicyclic acid, salicylic acid, mucic acid, muconic acid, and the like, giving the hydrochloride, hydrobromide, hydriodide, nitrate, phosphate, sulfamate, sulfate, acetate, citrate, tartrate, lactate, ascorbate, methanesulfonate, ethanesulfonate, quinate, 3-hydroxy-2-naphthoate, naponate, acetylsalicylate, salicylate, mucate, and muconate, respectively.

The acid addition salts are prepared preferably by reacting the free base and acid in an organic solvent, e.g., ethanol, acetone, dimethylformamide, etc., in which case the salt separates directly or can be obtained by concentration of the solution.

Although pharmaceutically-acceptable salts are preferred, all acid addition salts are within the scope of our invention. All acid addition salts are useful as sources of the free base form even if the particular salt per se is not desired as the final product, as for example when the salt is formed for purposes of purification or identification, or when it is used as an intermediate in preparing a pharmaceutically-acceptable salt.

The molecular structures of the compounds of our invention were assigned on the basis of study of their mode of synthesis and infrared spectra, and confirmed by the correspondence of calculated and found values for the elementary analyses for representative examples.

The invention sought to be patented, in another composition aspect, resides in an anti-inflammatory composition containing as the essential ingredient a therapeutic amount of 7-chloro-4-[4-(2-hydroxythylamino)-1-methylbutylamino]quinoline and a pharmaceutical carrier. The "therapeutic amount" is that quantity necessary for suppressing inflammation and will vary depending on the status of the inflammation, on the animal administered to, and on the route of administration.

The anti-inflammatory compositions of the invention can be administered orally or parenterally, preferably as oral solid compositions, such as capsules, tablets, dragees and pills which contain an appropriate amount of the 7-chloro - 4 - [4 - (2 - hydroxyethylamino) - 1 - methylbutylamino]quinoline and/or a pharmaceutically-acceptable salt thereof per dosage unit. The solid compositions for oral administration can contain from about 25 to 500 mg. of the 7 - chloro - 4 - [4 - (2 - hydroxyethylamino) - 1-methylbutylamino]quinoline and/or salt thereof per dosage unit. The liquid preparations for oral use are also prepared in such a manner that each dosage unit, such as one teaspoon or a given number of milliliters, contains from about 25 to 500 mg. of the 7-chloro-4-[4-(2-hydroxyethylamino) - 1 - methylbutylamino]quinoline and/or a salt thereof.

As used herein, the term "pharmaceutical carrier" denotes a solid or liquid devoid of significant anti-inflammatory activity composed of a single substance or a number of substances which may be solids, liquids or a combination of solids and liquids each of which is less toxic than an equal weight of the 7-chloro-4-[4-(2-hydroxyethylamino)-1-methylbutylamino]quinoline or salt thereof present in the composition when measured in the same animal host using the same method of administration, vehicle, etc. The compositions can be in the form of tablets, lozenges, capsules (either liquid or dry filled), dragees, pills, powders and aqueous and non-aqueous solutions or suspensions. Some examples of the substances which can serve as pharmaceutical carriers in the compositions of the invention are gelatin capsules; sugars such as lactose and sucrose; starches, such as corn starch and potato starch; cellulose derivatives, such as sodium carboxymethyl cellulose, ethyl cellulose, methyl cellulose, cellulose acetate phthalate; gelatin; talc; stearic acid; magnesium stearate; vegetable oils, such as peanut oil, cottonseed oil, sesame oil, olive oil, corn oil, and oil of theobroma; propylene glycol; glycerin; sorbitol; polyethylene glycol; water; agar; alginic acid; isotonic saline; and phosphate buffer solutions, as well as other non-toxic compatible substances used in pharmaceutical formulations.

In addition to the 7-chloro-4-[4-(2-hydroxyethylamino)-1-methylbutylamino]quinoline and/or pharmaceutically-acceptable salt thereof and a pharmaceutical carrier, the compositions of the invention can contain coloring agents, flavoring agents, and/or preservatives. These materials are used in relatively small amounts which do not add significantly to the toxicity of the final compositions. The compositions can, if desired, also contain other medicinal substances, e.g., other anti-inflammatory agents such as the corticosteroids, e.g., prednisone, prednisolone, cortisone, hydrocortisone and the 9- or 12-halo-corticosteroids; or non-steroids, e.g., acetylsalicylic acid, salicylamide, aminopyrine, chloroquine and hydroxychloroquine.

The invention sought to be patented, in the method aspect, is described as residing in the method for suppressing inflammation which comprises administering a therapeutic amount of 7-chloro-4-[4-(2-hydroxyethylamino)-1-methylbutylamino]quinoline.

The following examples will further illustrate the invention without, however, limiting it thereto.

Example 1

7 - chloro - 4 - [4 - (2 - hydroxyethylamino) - 1-methylbutylamino]quinoline.—To a mixture of 1200 ml. of 48% HBr and 275 ml. of concentrated sulfuric acid was added 500 g. of 7-chloro-4-(4-hydroxy-1-methylbutylamino) quinoline. The resulting mixture was heated rapidly to reflux on a hot plate and refluxed for about three minutes. The reaction mixture was cooled slightly and poured on an equal volume of ice. The aqueous mixture was extracted with chloroform. The extract was dried over anhydrous magnesium sulfate and concentrated in vacuo to remove the chloroform. To the residue was added 1200 g. of 2-hydroxyethylamine and the mixture was allowed to stand at room temperature for two days. The reaction mixture was heated in vacuo on a steam bath to remove about 700 ml. of the excess 2-hydroxyethylamine. The remaining material was treated with water, made strongly basic with 35% aqueous sodium hydroxide solution and extracted with chloroform. The extract was dried over anhydrous magnesium sulfate and concentrated in vacuo to remove the chloroform. The residue was heated with 1200 ml. of isopropyl acetate at reflux, allowed to cool to room temperature with stirring, and then stirred overnight. The product first separated as an oil and then slowly solidified. The precipitate was collected and recrystallized from 1200 ml. of methyl isobutyl ketone using decolorizing charcoal to yield 179 g. of 7 - chloro - 4 - [4 - (2 - hydroxyethylamino) - 1 - methylbutylamino]quinoline, M.P. 125–128° C.

The same product is also obtained by reacting 2-hydroxyethylamine with 7 - chloro - 4 - (4 - chloro - 1-methylbutylamino)quinoline, which is obtained by reaction of thionyl chloride with 7-chloro-4-(4-hydroxy-1-methylbutylamino)quinoline.

Example 2

7 - chloro - 4 - [4 - (2 - hydroxyethylamino) - 1 - methylbutylamino]quinoline dioxalate. — To a mixture containing 250 ml. of 48% HBr and 50 ml. of concentrated sulfuric acid was added 83 g. of 7-chloro-4-(4-hydroxy-1-methylbutylamino)quinoline. The mixture was refluxed for about two and one-half minutes. The reaction mixture was cooled and added to 300 ml. of water. The aqueous mixture was extracted with chloroform. The extract was dried over anhydrous calcium sulfate and the chloroform was distilled off in vacuo. The residue was added slowly to 370 g. of 2-hydroxyethylamine with cooling and the resulting reaction mixture was allowed to stand at room temperature for one hundred and twenty hours. Water was added to the reaction mixture whereupon a gummy precipitate separated. The precipitate was separated by pouring off the aqueous liquid and was washed with water. The precipitate was then dissolved in ethanol and added to a hot solution of 50 g. of oxalic acid in ethanol, and the resulting mixture allowed to stand for five days. The precipitate was collected, triturated with ethanol, recrystallized from water-isopropyl alcohol using decolorizing charcoal, and dried for sixteen hours at 60° C. in vacuo to yield 44 g. of 7-chloro-4-[4-(2-hydroxyethylamino) - 1 - methylbutylamino]quinoline dioxalate, M.P. 138.8–142.0° C. (corr.).

*Analysis.*—Calcd. for $C_{16}H_{22}ClN_3O \cdot 2C_2H_2O_4$: C, 49.23; H, 5.37; $N_{AP}$, 5.74; Cl, 7.27. Found: C, 49.47; H, 5.38; $N_{AP}$, 5.74; Cl, 7.39.

7 - chloro - 4 - [4 - (2 - hydroxyethylamino) - 1 - methylbutylamino]quinoline dioxalate was found to inhibit endotoxin-induced lung inflammation in mice when administered orally at a dose level of 200 mg./kg.

Example 3

7 - chloro - 4 - [4 - (2 - hydroxyethylamino) - 1 - methylbutylamino]quinoline pamoate. — A solution containing 4.87 g. of 7-chloro-4-[4-(2-hydroxyethylamino)-1 - methylbutylamino]quinoline dioxalate in water was made basic with aqueous potassium hydroxide solution and the alkaline solution was extracted with ethylene dichloride. The extract was washed with water, dried over anhydrous calcium sulfate and heated in vacuo to remove the solvent. The oily residue was dissolved in 125 ml. of dimethylformamide and to the solution was added a solution containing 3.88 g. of pamoic acid (2,2'-dihydroxy-1,1'-dinaphthylmethane-3,3'-dicarboxylic acid) in 125 ml. of dimethylformamide. To the solution was added 250 ml. of water whereupon a precipitate slowly separated. The precipitate was collected, washed successively with absolute ethanol and ether, and dried for sixteen hours at 80° C. in vacuo to yield 6.2 g. of 7-chloro-4-[4-(2-hydroxyethylamino) - 1 - methylbutylamino]quinoline pamoate, M.P. 275.4–276.8° C. with decomposition.

*Analysis.*—Calcd. for $C_{16}H_{22}ClN_3O \cdot C_{23}H_{16}O_6$: Cl, 5.09; N, 6.04. Found: Cl, 5.13; N, 6.01.

Following the procedures described in Examples 2 and 3 for the preparation of the dioxalate and pamoate salts and using in place of oxalic acid or pamoic acid corresponding molar equivalent quantities of the appropriate acids, e.g., phosphoric acid, sulfuric acid, methanesulfonic acid, 3-hydroxy-2-naphthoic acid, naponic acid, salicyclic acid, mucic acid and muconic acid, there are obtained the corresponding respective acid addition salts 7-chloro-4-[4-(2 - hydroxyethylamino) - 1 - methylbutylamino]quinoline, e.g., diphosphate, sulfate, di-(methanesulfonate), di-(3-hydroxy-2-naphthoate), naponate, disalicylate, mucate and muconate.

We claim:

1. 7 - chloro - 4 - [4 - (2 - hydroxyethylamino) - 1 - 1-methylbutylamino]quinoline.

2. A method for suppressing inflammation which comprises administering to an animal host a therapeutic amount of 7 - chloro - 4 - [4 - (2 - hydroxyethylamino) - 1-methylbutylamino]quinoline.

3. An anti-inflammatory composition containing as the essential ingredient a therapeutic amount of 7-chloro-4-[4-(2-hydroxyethylamino)-1-methylbutylamino]quinoline and a pharmaceutical carrier.

4. A solid anti-inflammatory composition in dosage unit form suitable for oral administration comprising a solid pharmaceutical carrier and as the essential therapeutic ingredient about 25 to 500 mg. of 7-chloro-4-[4-(2-hydroxyethylamino)-1-methylbutylamino]quinoline per dosage unit.

References Cited

UNITED STATES PATENTS 2,546,658 3/1951 Surrey -------------- 260—288

ALBERT T. MEYERS, *Primary Examiner.*

J. D. GOLDBERG, *Assistant Examiner.*

U.S. Cl. X.R.

260—288; 424—232, 240

UNITED STATES PATENT OFFICE
CERTIFICATE OF CORRECTION

ıtent No. 3,415,932 December 10, 1968

Emery W. Dennis et al.

It is certified that error appears in the above identified patent and that said Letters Patent are hereby corrected as shown below:

Column 1, line 33, "II" should read -- I --; line 48, "hydroxyl" should ead -- hydroxy --. Column 2, line 38, "(2-hydroxythylamino)" should read - (2-hydroxyethylamino) --. Column 4, lines 70 and 71, "(2-hydroxyethylamino) l-1-methylbutylamino" should read -- (2-hydroxyethylamino)-1-methylbutylamino -.

Signed and sealed this 31st day of March 1970.

SEAL)

ttest:

dward M. Fletcher, Jr.
ttesting Officer

WILLIAM E. SCHUYLER, JR.
Commissioner of Patents